United States Patent
Pan et al.

(10) Patent No.: US 8,254,563 B2
(45) Date of Patent: Aug. 28, 2012

(54) SYSTEM FOR LINE POWERING IN COMMUNICATIONS

(75) Inventors: Xuefeng Pan, Shenzhen (CN); Zhen Qin, Shenzhen (CN); Tianli Jiang, Shenzhen (CN); Yingjie Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1355 days.

(21) Appl. No.: 11/909,719

(22) PCT Filed: Mar. 24, 2006

(86) PCT No.: PCT/CN2006/000491
§ 371 (c)(1),
(2), (4) Date: Sep. 25, 2007

(87) PCT Pub. No.: WO2006/102829
PCT Pub. Date: Oct. 5, 2006

(65) Prior Publication Data
US 2008/0043947 A1      Feb. 21, 2008

(30) Foreign Application Priority Data
Mar. 31, 2005   (CN) .......................... 2005 1 0059805

(51) Int. Cl.
*H04M 1/00*          (2006.01)
(52) U.S. Cl. .................................. 379/413; 379/102.04
(58) Field of Classification Search ............ 379/102.04, 379/413–413.04
See application file for complete search history.

(56) References Cited

U.S. PATENT DOCUMENTS 5,289,359 A * 2/1994 Ziermann ................... 363/21.11
5,798,578 A * 8/1998 Thereze ........................ 307/18
6,459,171 B1 * 10/2002 Leifer ............................ 307/52
6,532,277 B2 * 3/2003 Ulanskas et al. ........... 379/27.01
(Continued)

FOREIGN PATENT DOCUMENTS
CN        1285680 A      2/2001
(Continued)

OTHER PUBLICATIONS

Written Opinion of the International Searching Authority in corresponding PCT Application No. PCT/CN2006/000491 (Jun. 15, 2006).
International Search Report in corresponding PCT Application No. PCT/CN2006/000491 (Jun. 15, 2006).
(Continued)

*Primary Examiner* — Simon Sing
(74) *Attorney, Agent, or Firm* — Leydig, Voit & Mayer, Ltd.

(57) ABSTRACT

This invention discloses a system for line powering in communications. The system for line powering includes a power supply at the central office and remote power supply units (PSUs) connected to the power supply, wherein the power supply at the central office comprises at least two central office PSUs, and the central office PSUs provide power for the remote PSUs after being connected in parallel. At least two central office PSUs are set and connected in parallel to provide power for the remote PSUs, which provides redundant power backup for the remote PSUs and ensures reliability of normal communications in the network communication system. This method also helps to reduce the number of PSUs at the central office power supply part, to save space of the equipment room and to facilitate monitoring of central office PSUs. Thereby, this solution achieves reliable communication services, high integration of central office equipment and cost-effective network communication system.

10 Claims, 2 Drawing Sheets

U.S. PATENT DOCUMENTS

| | | | |
|---|---|---|---|
| 6,690,718 | B1 | 2/2004 | Kim |
| 6,690,792 | B1 * | 2/2004 | Robinson et al. .............. 379/418 |
| 7,058,174 | B2 * | 6/2006 | Posthuma ..................... 379/413 |
| 2003/0063710 | A1 | 4/2003 | Berthe et al. |

FOREIGN PATENT DOCUMENTS

| | | |
|---|---|---|
| CN | 1333612 A | 1/2002 |
| CN | 1376358 A | 10/2002 |
| CN | 2632946 A | 8/2004 |
| CN | 1567816 A | 1/2005 |
| CN | 100596073 C | 3/2010 |
| EP | 1 030 429 | 8/2003 |
| WO | WO 99/63745 A1 | 5/1999 |
| WO | PCT/SE99/00871 | 12/1999 |

OTHER PUBLICATIONS $1^{st}$ Office Action in corresponding Chinese Application No. 200510059805.4 (Dec. 28, 2007).
2nd Office Action in corresponding Chinese Application No. 200510059805.4 (Jul. 3, 2009).
Extended European Search Report in corresponding European Application No. 06722143.2 (Feb. 12, 2008).
$1^{st}$ Office Action in corresponding European Application No. 06722143.2 (Apr. 24, 2008).
Blanc, "Line Powering in the Remote DSLAM World," Dec. 7, 2004, Pedestal Networks Inc., Fremont, California.
Office Action in corresponding European Application No. 06722143.2 (Dec. 9, 2011).

* cited by examiner

SYSTEM FOR LINE POWERING IN COMMUNICATIONS

CROSS REFERENCE

The present application claims the priority of Chinese application 200510059805.4, which was filed on Mar. 31, 2005.

TECHNICAL FIELD

The present invention relates generally to a line powering technology, and, more particularly, to a system for line powering in communications.

BACKGROUND

With the rapid development of network communications, line powering has become an important technology for expanding communication services. For example, in the current situation where the demand for the X Digital Subscriber Line (XDSL) service increases constantly, a universal method to expand new services to subscribers based on the existing DSL network is to move the DSL Access Multiplexer (DSLM) to the subscriber side. In this case, one or two twisted pair cables or a coaxial cable may be used as the uplink channel to access more subscribers and services over the DSLM. As the environment at the subscriber side is complex and it is inconvenient to provide power in most cases, the supply of power to the DSLM becomes a practical problem that is not easy to solve if the DSLM is moved to the subscriber side.

The line powering technology, which is intended to provide power from the central office to the DSLM at the subscriber side over the DSL, has become the primary support technology to operators' last mile solution. The line powering system will be applied in more and more network products.

In prior art systems, the line powering system is usually designed with a one-to-one technical solution, that is, at the DSL central office, set a Local Power Supply Unit (PSU) to convert the −48 V DC power to a DC proper higher voltage and load it to the DSL; and at the remote end, set a remote PSU which converts the voltage transferred from the DSL into the voltage required by the remote DSL as shown in FIG. 1.

In the one-to-one technical solution, when the PSU at the central office fails, the line powering system will cease the supply of power for the remote end apparatus, which causes communications to be interrupted. Therefore, the conventional line powering system cannot ensure reliability of communications. Besides, with this line powering system designed with one-to-one line powering, when the central office connects to N remote devices, N PSUs are needed at the central office, each connecting to one of the N remote PSUs and supplying power for it. In this case, the apparatus occupy a large space of the equipment room, and it is complicated to monitor the PSUs at the central office end.

SUMMARY

Disclosed are systems for line powering in communications that aim to eliminate the defects of prior art systems, for example, poor reliability and occupation of large space in the equipment room.

To achieve the above objective, examples of the invention provide a system for the line powering system that includes: a power supply at the central office and remote Power Supply Units (PSUs) connected to the power supply, wherein the power supply at the central office comprises at least two central office PSUs, and the central office PSUs provide power for the remote PSUs after being connected in parallel.

It can be learned from description of the above technical solution that at least two office end PSUs are set at the central office end to provide power for remote PSUs after being connected in parallel. This method provides power backup for the remote PSUs and ensures reliability of normal communications in the network communication system. This method also helps to reduce the number of PSUs at the office end power supply part, to save space of the equipment room and to facilitate monitoring of office end PSUs.

In addition, in a preferred solution of this invention, setting a certain number of circuit breakers in the tributaries between office end PSUs and remote PSUs may facilitate maintenance of remote PSUs and remote communication devices. The transmission of power monitoring signals between the power supply at the central office end and remote PSUs may facilitate monitoring of remote PSUs. The power supply at the central office end provides power for remote PSUs through different coupling methods. Thereby, the technical solution achieves reliable communication service, high integration of office end devices and cost-effective network communication system.

The construction and method of operation of the invention, however, together with additional objectives and advantages thereof will be best understood from the following description of specific embodiments when read in connection with the accompanying drawings.

DETAILED DESCRIPTION OF EMBODIMENTS

Figure 1:
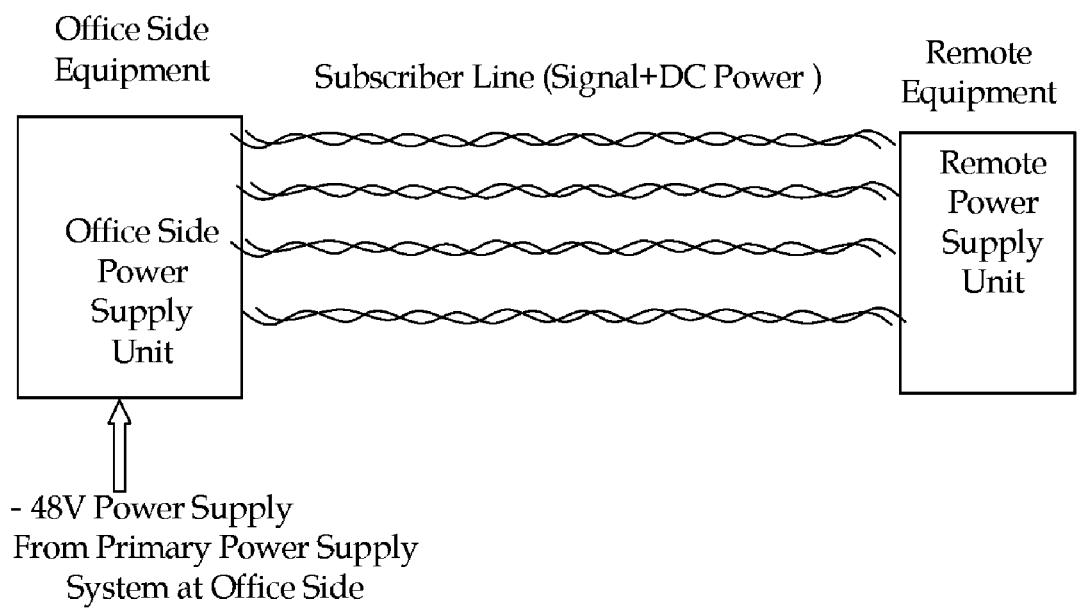
FIG. 1 shows the line powering system using the one-to-one line powering solution in prior arts.

The line powering system disclosed in the invention includes a power supply at the central office and remote PSUs connecting to the power supply. The power supply at the central office includes at least two central office PSUs, and the central office PSUs provide power for the remote PSUs after being connected in parallel.

The power supply at the central office may be equipped with PMUs, and the remote PSUs may also be equipped with remote PMUs. The remote PMUs monitor the voltage and current of the remote PSUs. Power monitoring signals are transmitted between the PMUs at central office and the remote site through power monitoring signal lines.

In an embodiment of the invention, there may be one or more remote PSUs. When there is more than one remote PSU, the remote PSUs connect with central office PSUs that provide power for the remote PSUs, that is, each of the PSUs at the central office power supply may provide power for multiple remote PSUs at the same time after being connected in parallel.

The PSUs at the central office power supply may provide power for remote PSUs in the following modes after being connected in parallel:

Mode 1: The power supply of the central office connects to each of the remote PSUs through two power cables. The positive and negative poles of the central office parallel PSUs form a power supply loop for each remote PSU through the two power cables. As a result, the central office PSUs can provide power for the remote PSUs.

DSLs or coaxial cables may be used as the power cables, and circuit breakers may be set for the power supply loops of the above the remote PSUs. The circuit breakers can be controlled manually or controlled by the central office PMUs. For example, if an central office PMU detects that the voltage or current of the power supply of a remote PSU is exceptional, the PMU controls the circuit breaker to cut off the power for the remote PSU.

There may be more than two power cables between the power supply of the central office and each remote PSU. The positive and negative poles of central office parallel PSUs form a power supply loop for each remote PSU through the power cables. As a result, the central office PSUs can provide power for the remote PSUs.

In this mode, the loop that enables central office PSUs to provide power for the remote PSUs does not relate to other cables such as communication signal lines or power monitoring signal lines. It only relates to power cables.

Mode 2: Provide power for the remote PSUs by means of couplers through communication signal lines that transmit communication signals.

There are at least two communication signal lines between the power supply at the central office and each remote PSU. The following describes this mode based on the example that the power supply at the central office provides power for a remote PSU through two communication signal lines.

The positive and negative poles of each central office parallel PSU are coupled to the two communication signal lines through the center taps of two central office service transformers related to the two communication signal lines. The remote PSU connecting to the two communication signal lines decouples the positive and negative voltages through the center taps of two remote service transformers to form a power supply loop for the remote PSU so that the remote PSU can be provided with power.

The power supply at the central office may also use more than two communication signal lines to provide power for a remote PSU. For example, when three communication signal lines are used, the positive and negative poles of the power supply at the central office connect randomly with the center taps of three central office service couplers related to the three communication signal lines. The remote PSU decouples the positive and negative voltages through the center taps of the three remote service transformers to form a power supply loop for the remote PSU.

Circuit breakers are set for the above loop of the remote PSU. The position of the circuit breaker may be set flexibly. For example, one may set a circuit breaker at the tributary between the positive pole or negative pole of the power supply at the central office and the center taps of office end transformers for each remote PSU, or set it on the lines through which the central office directly accesses subscribers, that is, C1 and C2 in FIG. 2. In this case, a remote PSU can be controlled by C1 and C2 in terms of disconnection. As another example, one may set a circuit breaker on each communication signal line where the positive and negative poles of central office power supply are coupled. The circuit breaker may be controlled manually or controlled by the central office PMU. For example, if the central office PMU detects that the voltage or current of the power supply of a remote PSU is exceptional through the remote PMU or power monitor signals, the PMU controls the circuit breaker to cut off the power for the remote PSU.

In this mode, the loop that enables the central office power supply to provide power for the remote PSUs does not relate to other lines in the communication system such as power monitoring signal lines. It relates to communication signal lines.

Mode 3: Provide power for the remote PSUs by means of couplers through communication signal lines that transmit communication signals and through power monitoring signal lines.

There are at least one communication signal line and one power monitoring signal line between the power supply at the central office end and each remote PSU. The following describes this mode based on the example that the power supply at the central office end provides power for a remote PSU through a communication signal line and a power monitoring signal line.

The negative and positive poles of office end parallel PSUs are coupled to the communication signal line and power monitoring signal line through the center tap of the office end service transformer related to the communication signal line and the office end monitoring transformer related to the power monitoring signal line. The remote PSU connecting to the communication signal line and power monitoring signal line decouples the positive and negative voltages from the communication signal line and power monitoring signal line through the center taps of the remote service transformer and remote monitoring transformer to form a power supply loop for the remote PSU. In this case, the remote PSU can be provided with power.

The power supply at the central office end may also provide power for a remote PSU through more than one communication signal line and more than one power monitoring signal line. For example, when there are two communication signal lines, two office end service transformers serve the lines accordingly. The positive and negative poles of the power supply at the central office end can randomly connect to the center taps of two office end service transformers and an office end monitoring transformer. The remote PSU decouples the positive and negative voltages through the center taps of two remote service transformers and a remote monitoring transformer to form a power supply loop for it.

A current breaker is set for the above loop of the remote PSU. The position of the circuit breaker may be set flexibly. For example, set a circuit breaker at the tributary between the positive pole or negative pole of the power supply at the central office and the center taps of central office transformers for each remote PSU, that is, C1 and C2 in FIG. 2, or set it on the positive or the negative line where the power supply at the central office is coupled. The circuit breaker may be controlled manually or controlled by the central office PMU. For example, if the central office PMU detects that the voltage or the current of the power supply of a remote PSU is exceptional through the PMU or the power monitor signals line, the PMU controls the circuit breaker to cut off the power for the remote PSU.

In this mode, the loop that transfer power from central office to the remote site relates to communication signal lines and power monitoring signal lines.

Mode 4: Provide power for the remote PSUs by means of couplers through the communication signal lines that transmit communication signals and power cables.

There are at least one communication signal line and one power cable between the power supply at the central office and each remote PSU. The following describes this mode based on an example that the power supply at the central office provides power for a remote PSU through a communication signal line and a power cable.

The positive pole or negative pole of parallel PSUs in central office is coupled to the communication signal line through the center tap of the central office service transformer related to the communication signal line, and the other pole is connected to the remote PSU through a power cable. The center tap of the remote service transformer decouples the positive voltage or negative voltage from the communication signal line and the remote PSU obtains the other voltage from the power cable to form a power supply loop. As a result, the remote PSU can be provided with power.

The power supply at the central office may also provide power for a remote PSU through more than one communication signal line. For example, when there are two communication signal lines, two central office service transformers serve the lines accordingly. The positive and negative poles of the power supply at the central office may randomly connect to the center taps of the two central office service transformers and power cables. The remote PSU decouples the positive or negative voltage through the center taps of two remote service transformers and obtains a pole voltage from the power cable to form a power supply loop for it. As a result, the remote PSU can be provided with power.

A circuit breaker is set for the above loop of the remote PSU. The position of the circuit breaker may be set flexibly. For example, one may set a circuit breaker at the tributary between the power supply at the central office and power cables for each remote PSU, or set one at the tributary between the positive pole or negative pole of the power supply at the central office and the center taps of central office service transformers for each remote PSU. For details of the setting, see positions C1 and C2 in FIG. 2. As another example, one may set a circuit breaker respectively on each communication signal line where the positive or negative pole of the power supply at the central office is coupled. The circuit breaker may be controlled manually or controlled by the central office PMU. For example, if the central office PMU detects that the voltage or current of the power supply of a remote PSU is exceptional through the PMU or the power monitor signal line, the PMU controls the circuit breaker to cut off the power for the remote PSU.

In this mode, the loop that enables the central office power supply to provide power for remote PSUs does not relate to other lines in the communication system such as power monitoring signal line. It relates to communication signal lines and power cables.

Mode 5: Provide power for remote PSUs by means of couplers and power cables through power monitoring signal lines that transmit power monitoring signals.

There are one power monitoring signal line and one power cable between the power supply at the central office and each remote PSU.

The positive pole or negative pole of central office parallel PSUs is coupled to communication signal lines through the center taps of central office monitoring transformers related to power monitoring signal lines, and the other pole is connected to remote PSUs through power cables. The center taps of remote monitoring transformers decouple the positive voltage or negative voltage from the power monitoring signal lines and the remote PSUs obtain the other voltage from the power cables to form a power supply loop. As a result, the remote PSUs can be provided with power.

A circuit breaker is set for the above loop of each remote PSU. The position of the circuit breaker may be set flexibly. For example, one may set a circuit breaker at the tributary between the power supply of the central office and power cables for each remote PSU, or set one at the tributary between the positive pole or negative pole of the power supply at the central office and the center taps of central office monitoring transformers for each remote PSU. For details of the setting, see positions C1 and C2 in FIG. 2. As another example, one may set a circuit breaker respectively on each monitoring signal line where the positive or negative pole of the power supply at the central office is coupled. The circuit breaker may be controlled manually or controlled by the central office PMU. For example, if the central office PMU detects that the voltage or current of the power supply of a remote PSU is exceptional through the PMU or the power monitor signal line, the PMU controls the circuit breaker to cut off the power for the remote PSU.

In this mode, the loop that enables the central office power supply to provide power for remote PSUs does not relate to other lines in the communication system such as communication signal line. It relates to power monitoring signal lines and power cables.

Mode 6: Provide power for remote PSUs by means of couplers and power cables through communication signal lines that transmit communication signals and power monitoring signal lines that transmit power monitoring signals.

In this mode, the loop that enables the central office power supply to provide power for remote PSUs relates to communication signal lines, power monitoring signal lines and power cables.

Figure 2:
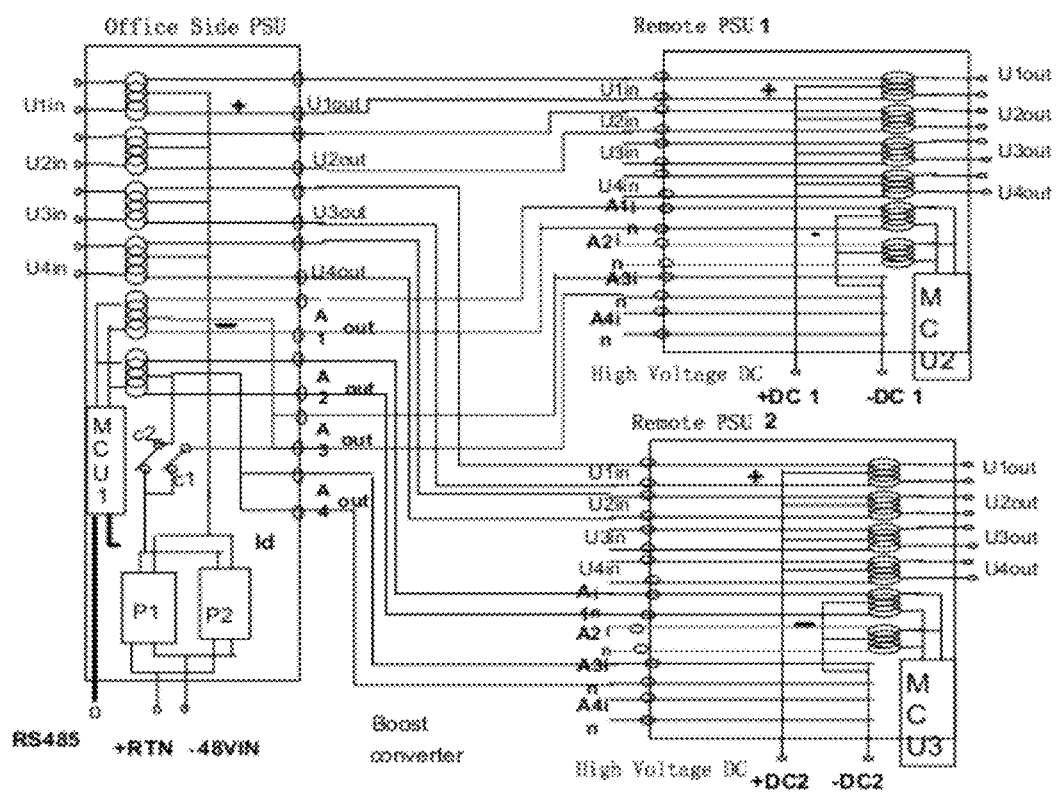
FIG. 2 shows the line powering system for communications according to one embodiment of the invention.

The following describes this mode based on the example, together with FIG. 2, that two PSUs are set at the central office, and connected in parallel to provide power for remote PSUs.

FIG. 2 shows the connection between the two central office PSUs connected in parallel and the two remote PSUs respectively.

In FIG. 2, the power supply at the central office provides power for the two remote PSUs in the 1+1 backup mode. That is, the two central office PSUs provide high voltage DC power for the remote PSUs of two remote DSL devices through the DSL. The power supply at the central office can monitor and protect the two remote PSUs independently. The detailed principle is as follows:

The central office provides −48 V DC power for the central office power supply that includes two central office PSUs P1 and P2 which connected in parallel. The working current of both P1 and P2 is half of a load. In this case, when one of the two central office PSUs fails, the other PSU can provide power normally for the load, thus realizing smooth power switchover and ensuring the redundant hot backup function of the central office power supply.

In the central office power supply, the transformer connecting to U1*in* is central office service transformer 1, the transformer connecting to U2*in* is central office service transformer 2, the transformer connecting to U3*in* is central office service transformer 3, the transformer connecting to U4*in* is central office service transformer 4, the transformer connecting to A3*out* is central office monitoring transformer 5, and the transformer connecting to A4*out* to central office monitoring transformer 6. In the remote PSU 1, remote service transformer 1 connects to the U1*in;* remote service transformer 2 connects to the U2*in*, remote service transformer 3 connects to the U3*in*, remote service transformer 4 connects to the U4*in*, and remote monitoring transformer 4 connects to the A1*in*. In the remote PSU 2, remote service transformer 7 connects to the U1*in*, remote service transformer 8 connects to the U2*in*, remote service transformer 9 connects to the U3*in*, remote service transformer 10 connects to the U4*in*, and remote monitoring transformer 11 connects to the A1*in*.

Through connections with center taps of central office service transformer 1, transformer 2, transformer 3 and transformer 4, the positive pole of the high-voltage DC power generated by the two central office parallel PSUs is coupled to the DSLs U1*in*, U2*in*, U3*in* and U4*in* used to transmit communication signals. The U1*in* and U2*in* connect to the center taps of remote service transformer 1 and remote service transformer 2 of the remote PSU 1 and U3*in* and U4*in* connect to the center taps of remote service transformer 7 and remote service transformer 8 of the remote PSU 2.

The remote PSU 1 decouples the positive pole of the DC power respectively, that is, +DC1, through the center taps of remote service transformer 1 and remote service transformer 2. The remote PSU 2 decouples the positive pole of the DC power respectively, that is, +DC2, through the center taps of remote service transformer 7 and remote service transformer 8.

The center taps of the central office service transformer 1, transformer 2, transformer 3 and transformer 4 described above may all connect to the negative pole of the high-voltage DC power generated by the two central office parallel PSUs, or some of the center taps of the central office service transformer 1, transformer 2, transformer 3, transformer 4 connect to the positive pole of the central office power supply while others connect to the negative pole of the power supply. That is, there is no restriction whether the center taps of the central office service transformer 1, transformer 2, transformer 3, transformer 4 connect to the positive pole or negative pole of the central office power supply.

Circuit breakers C1 and C2 corresponding to the remote PSU 1 and remote PSU 2 are added on the tributaries of the A3*out* and A4*out* at the negative loop of the DC power generated by the central office parallel PSUs P1 and P2. The circuit breakers may be resettable fuses, current detection devices or cut-out switches. The cut-out switches may be MOSFETs, or relays or contactors.

The circuit breakers C1 and C2 of the remote PSU 1 and remote PSU 2 can cut off the power for the remote PSU when single remote PSU fails or the lines are faulty so that the central office power supply can continue to provide power for the other remote PSU.

The positions of C1 and C2 can be set flexibly. There may be four C1s, set on lines U1*in* and U2*in* respectively where the positive pole of the central office power supply is coupled or on lines A1*out* and A3*out*. Similarly, there may be four C2s, set on lines U3*in* and U4*in* respectively where the positive pole of the central office power supply is coupled or on lines A2*out* and A4*out*. C1 and C2 may be controlled manually or controlled through the central office PMU MCU1. For example, MCU1 controls the circuit breakers to cut off the power for the remote PSU 1 or the remote PSU 2 when it detects the remote PSU 1 or the remote PSU 2 is exceptional through remote PMUs MCU2, MCU3 and lines A1*out* and A2*out*.

The negative loop of the central office parallel PSUs P1 and P2 is coupled to power monitoring signal lines A1*out* and A2*out* between the remote PSUs through the center taps of central office monitoring transformer 5 and central office monitoring transformer 6. The line About connects to the remote monitoring transformer 5 of the remote PSU 1, and the line A2*out* connects to the remote monitoring transformer 11 of remote PSU 2.

Through the center tap of the remote monitoring transformer 5, the remote PSU 1 decouples the line A3*out* that directly connects to the power supply 5 to obtain the negative DC power of remote PSU 1, that is, −DC1. Through the center tap of remote monitoring transformer 11, remote PSU 2 decouples line A4*out* that directly connects to the power supply to obtain the negative DC power of remote PSU 2, that is, −DC2.

The center taps of the central office monitoring transformer 5 and the central office monitoring transformer 6 described above may also connect to the positive pole of the high-voltage DC power generated by the two central office parallel PSUs. That is, the center taps of the central office monitoring transformers 5 and 6 can connect to the positive pole or negative pole of the central office power supply.

+DC1 and −DC1 are the power provided by the central office power supply for the remote PSU 1 and +DC2 and −DC2 are the power provided by the central office power supply for the remote PSU 2.

On A1*out* and A2*out*, power monitoring signals may be transferred between the central office power supply and the remote PSU 1 and the remote PSU 2. On U1-U4, data service signals may be transferred between the central office communication equipment and remote communication device 1 and remote communication device 2.

In the above-mentioned embodiments of the invention, the central office power supply may be designed with N+1 redundant power backup mode, that is, the central office power supply includes P1, P2, . . . PN and PN+1. The N+1 PSUs are connected in parallel and the working current of each PSU is one $N+1^{th}$ of the total current. When one or more than one central office PSU fails, the rest PSUs can still support the power demands of all remote DSL devices, thus realizing seamless power switching. The number of the remote PSUs may be increased to M, and the number of the circuit breakers may be increased to M accordingly.

To sum up, the technical solution has realized N+1 power backup for the remote PSUs. It ensures normal communications in the communication system, effectively reduces the number of the central office PSUs in the network communication system, saves the space of the equipment room, and facilitates monitoring of the central office PSUs and the remote PSUs as well as maintenance of the remote communication devices and the remote PSUs. This solution achieves reliable communication services, high integration of the central office equipment and cost-effective network communication system.

In addition, when there are multiple remote PSUs, one pole of the power supply providing power for different remote PSUs may be coupled through the center taps of transformers for transmission, or be transferred over twist wires directly without transformers or by combination of the two methods. The other pole of the power supply may be coupled for transmission in the same way as the one pole is, or in a different way. That is, the other pole may also be coupled through the center taps of transformers for transmission, or coupled without transformers or by combination of the two methods. The number of transmission channels relating to the poles above may be increased or decreased as required instead of being restricted by the number set in the two figures.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system for line powering in communications, comprising:
   a power supply at a central office and a plurality of remote Power Supply Units (PSUs) connected to the power supply,
   wherein the power supply at the central office comprises at least two central office PSUs and at least one central office service transformer connected to a communication signal line,
   the remote PSUs further comprise remote service transformers connected to communication signal lines,
   at least one of positive and negative poles of the central office PSUs after being connected in parallel is coupled to the communication signal line through center taps of the central office service transformers so as to provide power for the remote PSUs, and
   the remote PSUs decouple voltages of the remote PSUs from each of the communication signal lines through center taps of the remote service transformers corresponding to the central office service transformers which are different from each other.

2. The system of claim 1, wherein the power supply at the central office further comprises central office Power Monitoring Units (PMUs), and the remote PSUs further comprise remote PMUs connected to the central office PMUs through power monitoring signal lines;
   the remote PMUs monitor the remote PSUs in terms of power supply; and
   the PMUs at the central office monitor the remote PMUs.

3. The system of claim 1, wherein the power supply at the central office further comprises at least two central office transformers connected to different communication signal lines, the number of the remote service transformers connected to the communication signal lines being the same as the number of the central office service transformers;
   positive and negative poles of the central office PSUs connected in parallel are coupled to different communication signal lines through center taps of the central office service transformers.

4. The system of claim 2, wherein the power supply at the central office further comprises one central office monitoring transformer connected to power monitoring signal lines, and the remote PSUs further comprise a remote monitoring transformer connecting to the power monitoring signal lines;
   positive and negative poles of the central office PSUs connected in parallel are coupled to different communication signal lines and power monitoring signal lines through the center tags of different central office service transformers and central office monitoring transformers; and
   the remote PSUs decouple their negative and positive voltages from the communication signal lines and the power monitoring signal lines through center taps of the remote service transformers and the remote monitoring transformers.

5. The system of claim 1, wherein the number of the remote service transformers being the same as the number of the central office service transformers;
   one pole of the central office PSUs connected in parallel is coupled to the communication signal lines through center tap tags of the central office service transformers;
   the other pole of the central office PSUs connected in parallel directly connects with the corresponding pole of the remote PSUs through power cables; and
   the remote PSUs decouple one pole of the PSUs from the communication signal lines accordingly through center taps of the remote service transformers.

6. The system of claim 2, wherein the power supply at the central office further comprises one central office monitoring transformer connected to power monitoring signal lines;
   positive and negative poles of the central office PSUs connected in parallel are connected to one end of power cables and center taps of the central office service transformers and the central office monitoring transformers that couple the positive and negative poles into the communication signal lines and the power monitoring signal lines; and
   the remote PSUs connected to the other end of power cables decouple their negative and positive poles from the communication signal lines and the power monitoring signal lines through center taps of the remote service transformers and the remote monitoring transformers.

7. The system of claims 1, wherein the number of the remote PSUs is more than one, and the central office PSUs paralleled are connected to the remote PSUs respectively to provide power for the remote PSUs.

8. The system of claim 7, wherein one pole of the power supply providing power for different remote PSUs may be coupled through the center taps of transformers for transmission, or be transferred over twist wires without transformers or by combination of the two methods, and the other pole may be coupled for transmission in the same way or in a different way.

9. The system of claim 7, wherein circuit breakers are set at tributaries between the central office PSUs connected in parallel and the remote PSUs.

10. The system of claim 1, wherein the working current of the central office end PSUs is the same.

* * * * *